United States Patent [19]
Findikli et al.

[11] Patent Number: 6,157,835
[45] Date of Patent: Dec. 5, 2000

[54] SYSTEM AND METHOD FOR DETECTING AND HANDLING SYSTEM AND CAPABILITY CHANGES IN HANDOFFS OF CELLULAR CALLS

[75] Inventors: Nadi S. Findikli, Cary; Scott G. Hicks, Apex, both of N.C.

[73] Assignee: Ericsson Inc., Research Triangle Park, N.C.

[21] Appl. No.: 09/033,447

[22] Filed: Mar. 2, 1998

[51] Int. Cl.[7] .................................................. H04Q 7/20
[52] U.S. Cl. .......................... 455/436; 455/432; 455/437; 455/552
[58] Field of Search .................. 455/436, 439, 455/552, 553, 437, 438, 432, 435; 370/329, 331

[56] References Cited

U.S. PATENT DOCUMENTS 5,887,260  3/1999  Nakata ..................................... 455/436

FOREIGN PATENT DOCUMENTS

0725552A2  1/1996  European Pat. Off. .
98/03031   1/1998  WIPO .

*Primary Examiner*—Lee Nguyen
*Attorney, Agent, or Firm*—Wood, Phillips, VanSanten, Clark & Mortimer

[57] ABSTRACT

In a mobile station used in a cellular mobile telecommunication system that communicates on any one of a plurality of base station cellular channels depending on cell location of the mobile station, the system being adapted to selectively determine one of the channels to process a call with the mobile station and handoff a cellular call with the mobile station from a current channel to a new channel, a handoff system for detecting system and capability changes when a handoff has occurred. The handoff system includes a memory storing data representing parameters associated with the current channel. A forward communication channel is associated with the current channel for receiving data from a base station. The data includes a handoff message if a handoff is to occur. The handoff message includes parameters associated with the new channel. A comparator associated with the memory compares select stored parameters associated with the current channel to corresponding select received parameters associated with the new channel to determine if system or capabilities of the new channel differ from system or capabilities of the current channel.

18 Claims, 2 Drawing Sheets

SYSTEM AND METHOD FOR DETECTING AND HANDLING SYSTEM AND CAPABILITY CHANGES IN HANDOFFS OF CELLULAR CALLS

FIELD OF THE INVENTION

This invention relates to a system and method for handing off a cellular call between cellular channels and, more particularly, to the detecting and handling of system and capability changes in handoffs.

BACKGROUND OF THE INVENTION

A cellular mobile telecommunication system includes a mobile station communicating with any one of a plurality of geographically spaced base stations. Each base station is located in a pre-defined "cell". The base stations communicate with a mobile switching center which selectively determines which of the base stations and channels should process a call with the mobile station based on considerations such as signal strength between each available channel and the mobile station.

As a mobile station moves from one cell to another, the signal strength diminishes. Therefore, the call must be switched from one base station to another base station. This is referred to as a "handoff". The handoff is ideally implemented without interfering with the call in progress.

When a call is handed off, the handoff may be from one cellular system to another cellular system. Use of a different cellular system can result in different handling of the call. Likewise, capabilities vary among different systems. For example, some systems might include features such as voice privacy, message encryption, automatic retransmission for long messages or the like. It can be helpful for the mobile station to be aware that a change in system or capability has occurred. This could be accomplished by the mobile station automatically requesting what features are supported by making a capability update request. Ideally, this would be done before activating some feature which might not be available. However, sending of a capability request can degrade voice quality at handoff, as there is substantial data transferred in a message.

The present invention is directed to overcoming one or more of the problems discussed above in a novel and simple manner.

SUMMARY OF THE INVENTION

In accordance with the invention there is provided a system and method of handing off a cellular call including detecting and handling system and capability changes in handoffs.

Broadly, there is disclosed herein in a mobile station used in a cellular mobile telecommunication system communicating on any one of a plurality of base station cellular channels depending on cell location of the mobile station, the system being adapted to selectively determine one of the channels to process a call with the mobile station and handoff a cellular call with the mobile station from a current channel to a new channel, a handoff system for detecting capability changes when a handoff has occurred. The handoff system includes a memory storing data representing parameters associated with the current channel. A forward communication channel is selectively assay with the current channel for receiving data from a base station. The data includes a handoff message if a handoff is to occur. The handoff message includes parameters associated with the new channel. A comparator associated with the memory compares select stored parameters associated with the current channel to corresponding select received parameters associated with the new channel to determine if capabilities of the new channel differ from capabilities of the current channel.

It is a feature of the invention that the comparator classifies capability comparisons as change, no change, or inconclusive. The comparator is selectively configured to group inconclusive changes with either change or no change classifications.

It is another feature of the invention to provide a reverse communication channel selectively associated with the current channel for transmitting data to a base station. The mobile station generates a capability update request if the comparator determines that the new channel has different capabilities from the current channel. The mobile station stores updated capability information in the memory.

It is a further feature of the invention that the forward communication channel comprises a forward analog voice channel and the handoff message is received as part of a mobile station control message.

It is another feature of the invention that the forward communication channel comprises a forward digital traffic channel and the handoff message is received as part of a normal handoff message or a dedicated digital traffic channel handoff message.

There is disclosed herein in accordance with another aspect of the invention a method for detecting capability changes when a handoff has occurred in a mobile station used in a cellular mobile telecommunication system communicating on any one of a plurality of base station cellular channels depending on cell location of the mobile station. The system is adapted to selectively determine one of the channels to process a call with the mobile station and handoff a cellular call with the mobile station from a current channel to a new channel. The method comprises the steps of storing data representing parameters associated with the current channel, the mobile station receiving data from a base station via a forward communication channel associated with the current channel, the data including a handoff message if a handoff is to occur, the handoff message including parameters associated with the new channel; and comparing the select stored parameters associated with the current channel to corresponding select received parameters associated with the new channel to determine if capabilities of the new channel differ from capabilities of the current channel.

Further features and advantages of the invention will be readily apparent from the specification and from the drawing.

DETAILED DESCRIPTION OF THE INVENTION

Figure 1:
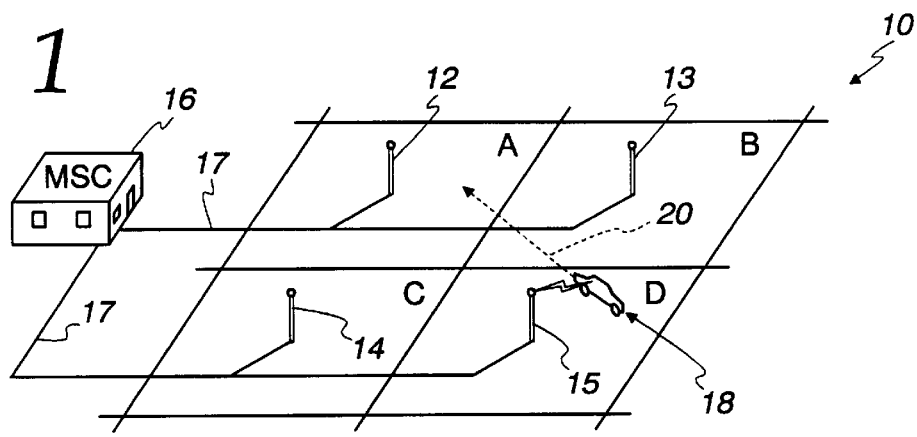
FIG. 1 is a perspective view of a cellular mobile telecommunication system.

Referring initially to FIG. 1, a cellular mobile telecommunication system 10 of conventional construction is illustrated. As is well known, the cellular system 10 is defined by plural cells, including representative cell locations A, B, C and D. Each cell A-D includes a respective base station 12, 13, 14 and 15. Each of the base stations 12–15 communicates with a mobile switching center 16 via intercellular trunks 17. A mobile station, represented at 18, may consist of, for example, a cellular phone carried by a user in an automobile. However, as is apparent, the mobile station may comprise any known form of mobile station capable of communicating within a cellular mobile telecommunication system 10.

The telecommunication system 10 is operable to select from one of the base stations 12–15 to process a call with the mobile station 18. As illustrated, the mobile station 18 is located in cell location D. Consequently, the call in progress would be handled by a cellular channel associated with the base station 15. If the mobile station 18 is stationary, then the call would likely be handled until completion by the base station 15. However, if the mobile station is moving, then it could cross into different cells. For example, as illustrated, the mobile station 18 might be moving in a direction as indicated by the dashed line 20 and traverse into cell location B and subsequently cell location A. A typical cellular mobile telecommunication system 10 utilizes handoffs to hand a call off from a channel of the base system 15 to a channel of the base station 13, and subsequently from the base station 13 to the base station 12, as the mobile station traverses from cell location D to respective cell locations B and A.

The cellular telecommunication system 10 does not itself form part of the invention. Instead, the invention relates to detecting and handling cellular system and capability changes in handoffs.

Presently, standard IS 136 forms a compatibility standard for cellular mobile telecommunication systems. This standard ensures that a mobile station can obtain service in any cellular system manufactured according to that standard. The standard for IS 136 is incorporated by reference herein.

In the illustration of FIG. 1, a handoff involving an analog voice channel typically occurs as the mobile station 18 crosses from the cell location D to the cell location B. However, the handoff does not necessarily occur strictly as a boundary is crossed. Instead, the one base station 15 senses that there is a deterioration of the signal with the mobile station 18. As a result, the one base station 15 sends a handoff request to the mobile switching center 16. Not knowing which direction the mobile station 18 is moving, the mobile switching center 16 sends handoff measurement requests to the adjacent base stations, such as the base stations 12, 13 and 14. Each of these base stations 12–14 monitors power from the mobile station 18. The base stations 12–14 send measurement responses to the mobile switching center 16. The mobile switching center 16 then sends a channel assignment to the one base station 15 containing information on another one of the base stations 12–14 to which the call will be handed off. The one base station 15 then transmits the handoff order to the mobile station 18 over a forward communication channel. As a result, the mobile station reprograms itself to subsequently communicate with the other base station, such as the base station 13.

Handoffs involving digital traffic channels are handled differently. The cellular system sends the mobile station 18 a list of neighboring channels to monitor. The mobile station 18 reports the measured signal level from its own channel as well as from those of the channels in the list. The cellular system uses these reports to decide when to make the handoff.

Present cellular systems 10 include analog systems and digital systems. With an analog system, during a call in progress the mobile station 18 communicates with the particular base station, such as the base station 15, via an analog voice channel. As is well known, the forward analog channel sends a data stream from the base station 15 to the mobile station 18. A reverse analog voice channel sends a data stream from the mobile station 18 to the base station 15. A mobile station control message is the only message transmitted over the forward voice channel. The mobile station control message, as described in IS 136.2, section 3.7.2.1, consists of one or more words defining communications. The mobile station control message is periodically sent to the mobile station and includes information on handling of the call, including for handoffs.

Digital cellular systems utilize reverse and forward digital traffic channels (DTCs) for transporting user information and signalling between a base station and a mobile station. As described in IS 136, the forward digital traffic channel has associated two separate control channels, namely, a fast associated control channel (FACCH) and a slow associated control channel (SACCH).

In a digital system there are two types of handoffs. A normal handoff or a dedicated handoff. With a normal handoff, a handoff message is sent from the base station to the mobile station via the FACCH channel. For a dedicated digital traffic channel handoff, a, distinct message is sent from the base station to the mobile station to order the mobile station from one digital traffic channel to another digital traffic channel via the FACCH channel.

As described in IS-136, when a mobile station is on a digital traffic channel, it makes assumptions as to the capability of the system the DTC belongs to. The basis for these assumptions in part is present in the control channel that the mobile station was camping on before being assigned to the DTC. However, when the mobile station is handed off to another DTC, it is not always clear if the new DTC belongs to the same system as the old DTC. This makes it difficult to estimate the capability of the new channel. Similarly, the mobile station desirably has knowledge of whether the channel being handed off to has the same capabilities as the channel it is leaving. This information can be used in performing more efficient scanning when the call is ended, for example.

If the mobile station does not know the capabilities of the new system, it might attempt to perform certain functions resulting in no response from the system, which causes the user interface of the mobile station to act erratically, or results in miscommunication between the mobile station and the system, causing the call to be degraded or dropped. While the mobile station could request system capability after every handoff, voice quality would be degraded at every handoff.

In accordance with the invention, a system and method is contemplated for detecting and handling system and capability changes in handoffs. Particularly, in systems that do not directly inform the mobile station of changes to the system and capability of the new channel during handoffs, other information available during handoff is used to deduce changes. There is a basic assumption that all channels in a system have the same capability so that detection of change of system will be used to trigger a capability request from the system.

There exist a number of sources of information relating to changes during handoffs. The information is typically found in values of parameters received on the current channel, i.e., the channel on which the handoff is received. In analog systems the handoff is received as part of the mobile station control message, discussed above. In digital systems, either a normal handoff message or a dedicated digital traffic channel handoff message is received.

Among the criteria to be used in selection are protocol version, burst length, hyperband and channel.

With respect to protocol version, the parameters are labeled as Protocol Version Indicator (PVI) or Protocol Version (PV). For the PVI a one bit value is used to indicate whether version EIA553/IS-54 or IS-136 is supported on the channel. The former is for analog, while the latter is for digital control channels. The PV value is used to indicate whether EIA553/IS-54A, TIA/EIA627, IS-136 REV 0, or IS-136 REV A is supported on the assigned channel. Since different protocol versions, i.e., different specifications or different revisions of the same specification, have different capabilities, any change in protocol version may indicate a change in capability. Two different systems with the same protocol version may have different capabilities. Therefore, if both are the same, then the change is inconclusive.

The burst length indicates the format of the transmission represented by a Shortened Burst Indication (SBI). The values of SBI can be as follows:

00=transmit normal burst after cell-to-cell handoff

01=transmit normal burst after handoff within cell

10=transmit shortened burst after cell-to-cell handoff

11=reserved If the hand off is known to be within a cell, it can be assumed that the mobile stays within the same system. A cell is the smallest unit of a cellular system. A cell-to-cell handoff is inconclusive as to capability changes.

The parameter for hyperband is a target hyperband. Presently, the values are 00 for 800 MHz, or 01 for 1900 MHz. The channel numbers are defined as follows:

| Channel Number | | |
|---|---|---|
| 800 MHz | 1–333 | a |
| | 667–716 | |
| | 991–1023 | |
| | 334–666 | b |
| | 717–799 | |
| 1900 MHz | 2–501 | A |
| | 666–1167 | B |
| | 1499–1998 | C |
| | 499–667 | D |
| | 1166–1334 | E |
| | 1333–1501 | F |

There is an underlying assumption in cellular systems that each "band" is occupied by a system, and a given operator uses only one band in a given area. The eight bands (a,b at 800 MHz, and A–F at 1900 MHz) therefore should indicate different systems. The exact determination of the band the mobile station is currently in and is being handed off to is done by using the hyperband and channel parameters received as part of the handoff message. If the handoff is within the same band, then the conclusion is inconclusive since there will always be neighboring systems using the same band.

The available information given is dependent on the classification of handoffs. There are five types of handoffs that might occur. The handoff can be from an analog voice channel (AVC) to another AVC or to a digital traffic channel (DTC). Alternatively, the handoff can be from a DTC to an AVC or another DTC. If the call is from one DTC to another DTC, then it can be a normal handoff or a dedicated handoff. In order to detect system and capability changes in handoff, available information depending on the type of handoff is used in order of relative priority. This is illustrated with the following tables. In the tables the highest priority criterion will be evaluated first. If the conclusion is deemed inconclusive, then the next priority criterion is evaluated until completion. If the last criterion is inconclusive, then the overall decision is deemed inconclusive. Hence, the overall process has three outcomes, namely, change, no change, and inconclusive. In accordance with the invention the process can be defined as optimistic, in which inconclusive outcomes are grouped with no change, or pessimistic, in which inconclusive outcomes are grouped with change.

A conventional cellular mobile station includes processing capability and associated memory. The processing controls operation of the mobile station. The memory stores various data necessary for operation. Among the data stored are parameters associated with the current cellular channel. When a handoff message is received on a forward communication channel, the handoff message includes parameters associated with the new channel. As part of the processing, select ones of the stored parameters associated with the current channel are compared to corresponding select received parameters associated with the new channel to determine if the system or capabilities of the new channel differ from the system or capabilities of the current channel. The particular parameters compared and their relative priority are defined in accordance with the following tables dependent on the classification of particular handoff:

| | AVC → AVC Handoffs | | |
|---|---|---|---|
| Priority | Information/Element | Value | Conclusion |
| 1 | Protocol version (PVI) | Same as current channel | Inconclusive |
| | | Different from current channel | Change |
| 2 | Channel Number | Same band as current channel | Inconclusive |
| | | Different band from current chan. | Change |

| | AVC → DTC Handoffs | | |
|---|---|---|---|
| Priority | Information/Element | Value | Conclusion |
| 1 | Shortened Burst Indicator (SBI) | (01) Handoff within cell | No Change |
| | | Else | Inconclusive |
| 2 | Protocol Version derived from Qualifier Code | Same as current channel | Inconclusive |
| | | Different from current channel | Change |
| 3 | Channel Number | Same band as current channel | Inconclusive |
| | | Different band from current chan. | Change |

DTC → AVC and DTC Normal Handoffs

| Priority | Information/Element | Value | Conclusion |
|---|---|---|---|
| 1 | Shortened Burst Indicator (SBI) | (01) Handoff within cell | No Change |
| | | Else | Inconclusive |
| 2 | Protocol Version (PV) | Same as current channel | Inconclusive |
| | | Different from current channel | Inconclusive |
| 3 | Channel Number | Same band as current channel | Inconclusive |
| | | Different band from current chan. | Change |

DTC → DTC Dedicated Handoffs

| Priority | Information/Element | Value | Conclusion |
|---|---|---|---|
| 1 | Shortened Burst Indicator (SBI) | (01) Handoff within cell | No Change |
| | | Else | Inconclusive |
| 2 | Protocol Version (PV) | Same as current channel | Inconclusive |
| | | Different from current channel | Change |
| 3 | Hyperband | Same band as current channel | Inconclusive |
| | | Different from current channel | Change |
| 4 | Channel Number | Same band as current channel | Inconclusive |
| | | Different band from current chan. | Change |

In accordance with the invention the mobile station always keeps track of whether the system and capability is known or not. With digital traffic channels, anytime a new channel is encountered and the new system or capability is not known, it will be requested and saved.

Figure 2:
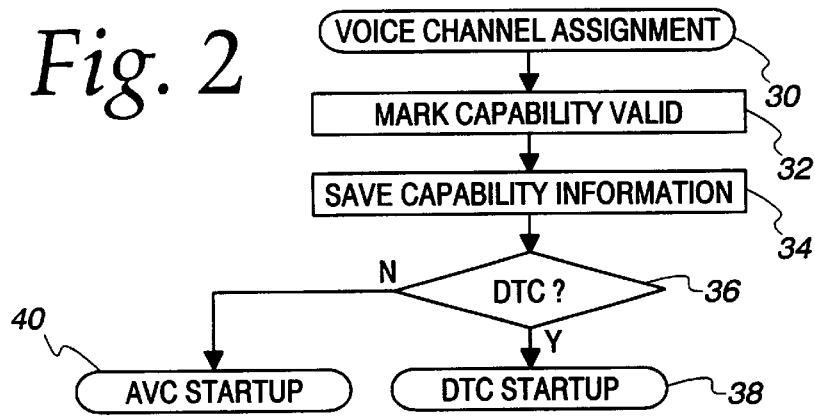
FIG. 2 is a flow diagram illustrating a call initialization routine implemented in a mobile station according to the invention.

Referring to FIG. 2, a flow diagram illustrates a call initialization routine implemented in the mobile station 18 when a call is initially set up. The typical call setup routine includes a voice channel assignment routine beginning at a node 30. The voice channel assignment is conventional in nature and includes information about the system in the control channel broadcast information, as well as voice channel specific information in the assignment. At a block 32 a capability parameter is marked as "valid". This indicates that the capability of the system is known. The capability information received as part of the assignment is then stored in memory at a block 34. A decision block 36 determines if the assigned channel is a DTC. If so, then control proceeds to a DTC startup routine at a node 38. If not, then an AVC startup routine is implemented at a node 40. The DTC startup routine is described below relative to FIG. 5. The AVC startup routine is not described herein, as it is conventional in nature.

Figure 3:
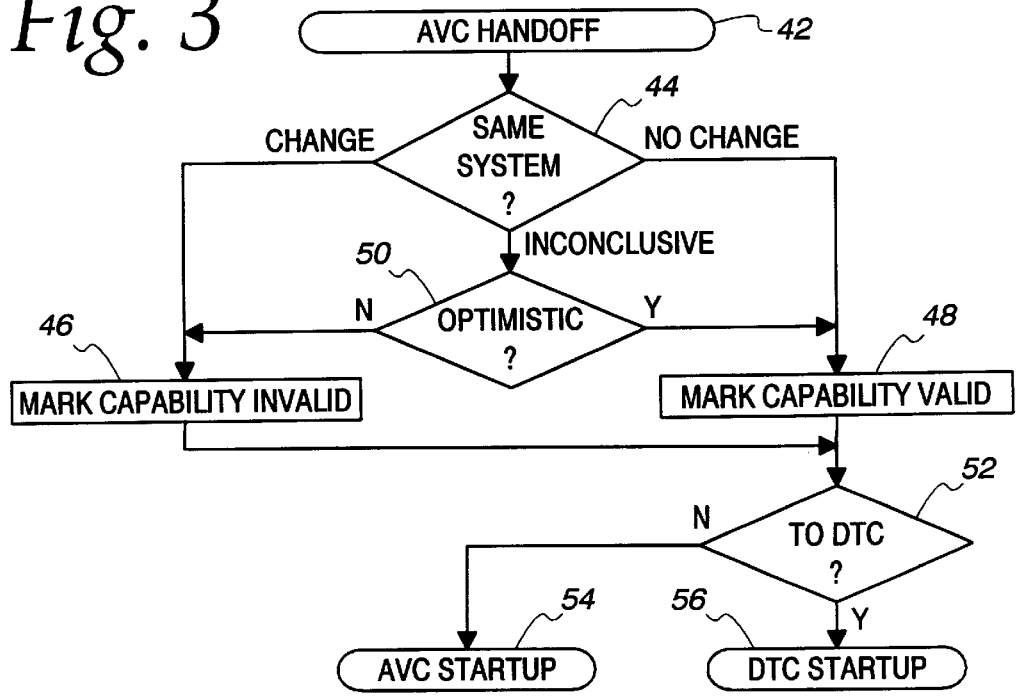
FIG. 3 is a flow diagram illustrating a handoff routine implemented for an analog voice channel in a mobile station according to the invention.

FIG. 3 illustrates a flow diagram implemented when a handoff message is received from an AVC. The AVC handoff message is initially received at a node 42. A decision block 44 then compares the select parameters defined in the tables above for the current channel and the new channel to determine if the system or capabilities have changed. If there has been a change, then the capability is marked as invalid at a block 46. If there has been no change, then the capability is marked as valid at a block 48. If the conclusion is inconclusive, then a decision block 50 determines if the algorithm in the mobile station is classified as optimistic. If not, then the capability is marked as invalid at the block 46. If so, then the capability is marked as valid at the block 48. From either block 46 or block 48 a decision block 52 determines if the handoff was to a DTC. If not, then the AVC startup routine is implemented at a node 54. If so, then the DTC startup routine is implemented at the block 56.

Figure 4:
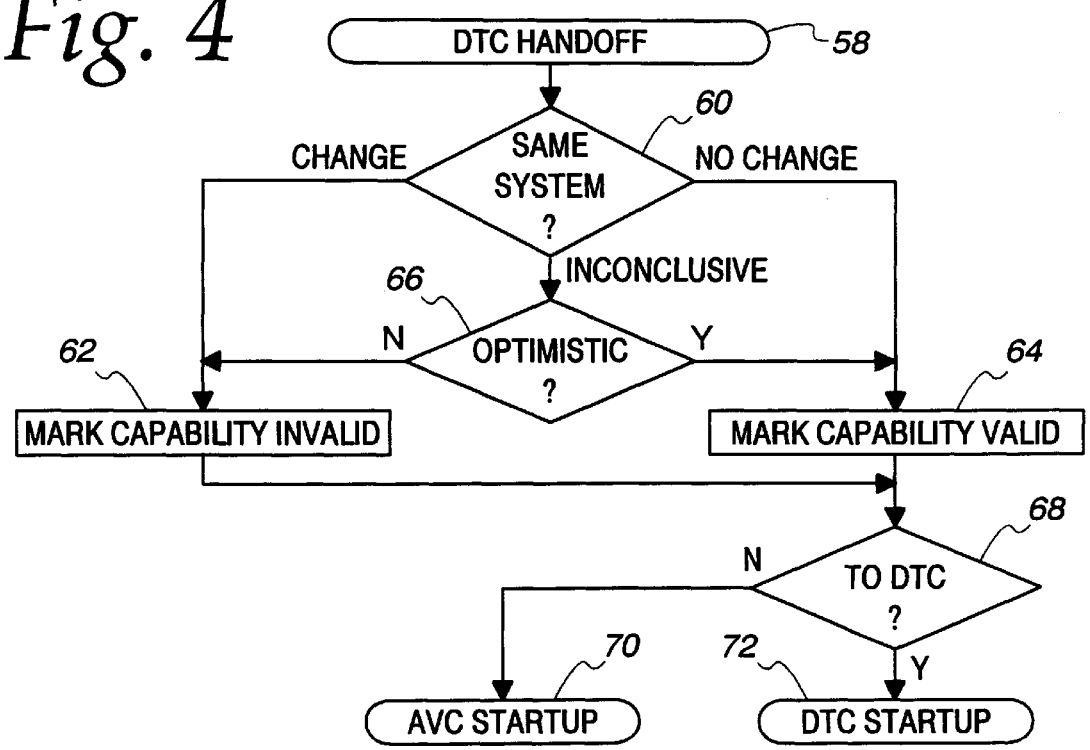
FIG. 4 is a flow diagram illustrating a handoff routine implemented for a digital traffic channel in a mobile station according to the invention.

Referring to FIG. 4, a routine is implemented when a handoff message is received to handoff from a DTC. This begins at a node 58 when the DTC handoff message is received. A decision block 60 then compares the select parameters defined in the tables above for the current channel and the new channel to determine if the system or capabilities have changed. If changes have been detected, then the capability is marked as invalid at a block 62. If there has been no change, then the capability is marked as valid at a block 64. If the outcome is inconclusive, then a decision block 66 determines if the algorithm in the mobile station is classified as optimistic. If not, then the capability is marked as invalid at the block 62. If so, then the capability is marked as valid at the block 64.

From the block 62 or 64, a decision block 68 determines if the handoff is to a DTC. If not, then the AVC startup routine is implemented at a node 70. If so, then a DTC startup routine is implemented at a node 72.

Figure 5:
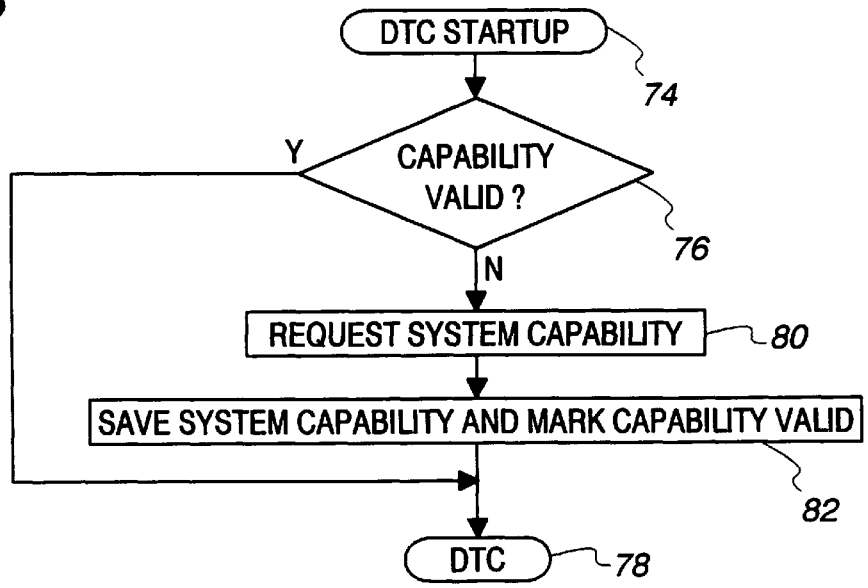
FIG. 5 is a flow diagram illustrating a start on digital traffic channel routine implemented by the mobile station according to the invention.

Referring to FIG. 5, a flow diagram illustrates the DTC startup routine which begins at a node 74. The DTC startup routine includes normal startup parameters for conventional DTC systems. Additionally, a decision block 76 determines if the present capability is marked as valid or invalid. If valid, indicating that there has been no change to the system or capability, then normal DTC startup concludes at a node 78. If the capability is not valid, then there has been a change in either the system or capabilities. A block 80 requests system capability by transmitting a request on the reverse digital traffic channel. The system capability information received from the base station is then stored in memory at a block 82 and the capability is marked valid. The normal DTC routine then continues at the node 78. This capability information is then used when subsequent handoffs occur to detect and handle changes, in the same manner as described.

As used herein, the term "forward communication channel" is intended to refer to the forward analog voice channel in analog voice systems and the forward dedicated traffic channel in digital systems.

Thus, in accordance with the invention there is described a system and method for detecting and handling system and capability changes when a handoff has occurred in a cellular mobile telecommunication system.

We claim:

1. In a mobile station used in a cellular mobile telecommunications system communicating on any one of a plurality of base station cellular channels depending on cell location of the mobile station, the system being adapted to selectively determine one of the channels to process a call with the mobile station and hand off a cellular call with the mobile station from a current channel to a new channel, a handoff system for detecting system and capability changes when a handoff has occurred, comprising:

a memory storing data representing parameters associated with the current channel;

a forward communication channel associated with the current channel for receiving data from a base station, said data including a handoff message if a handoff is to occur, the handoff message including parameters associated with the new channel; and a comparator associated with the memory for comparing select stored parameters associated with the current channel to corresponding select received parameters associated with the new channel to determine if system or capabilities of the new channel differ from system or capabilities of the current channel.

2. The handoff system of claim 1 wherein said comparator classifies capability comparisons as change, no change or inconclusive.

3. The handoff system of claim 2 wherein said comparator is selectively configured to group inconclusive changes with either change or no change classifications.

4. The handoff system of claim 1 further comprising a reverse communication channel selectively associated with the current channel for transmitting data to a base station.

5. The handoff system of claim 4 wherein said mobile station generates a capability update request if the comparator determines that the new channel has different system or capabilities from the current channel.

6. The handoff system of claim 5 wherein the mobile station stores updated capability information in the memory.

7. The handoff system of claim 1 wherein the forward communication channel comprises a forward analog voice channel and the handoff message is received as part of a mobile station control message.

8. The handoff system of claim 1 wherein the forward communication channel comprises a forward digital traffic channel and the handoff message is received as part of a normal handoff message.

9. The handoff system of claim 1 wherein the forward communication channel comprises a forward digital traffic channel and the handoff message is received as part of a dedicated digital traffic channel handoff message.

10. A method for detecting system and capability changes when a handoff has occurred in a mobile station used in a cellular mobile telecommunications system communicating on any one of a plurality of base station cellular channels depending on cell location of the mobile station, the system being adapted to selectively determine one of the channels to process a call with the mobile station and hand off a cellular call with the mobile station from a current channel to a new channel, the method comprising the steps of:

storing data representing parameters associated with the current channel;

the mobile station receiving data from a base station via a forward communication channel associated with the current channel, said data including a handoff message if a handoff is to occur, the handoff message including parameters associated with the new channel; and comparing select stored parameters associated with the current channel to corresponding select received parameters associated with the new channel to determine if system or capabilities of the new channel differ from system or capabilities of the current channel.

11. The method of claim 10 wherein said comparing step classifies capability comparisons as change, no change or inconclusive.

12. The method of claim 11 wherein said comparing step is selectively configured to group inconclusive changes with either change or no change classifications.

13. The method of claim 10 further comprising the step of transmitting data to a base station via a reverse communication channel selectively associated with the current channel.

14. The method of claim 13 further comprising the step of generating a capability update request if the comparing step determines that the new channel has different system or capabilities from the current channel.

15. The method of claim 14 further comprising the step of storing updated a capability information in the memory.

16. The method of claim 10 wherein the forward communication channel comprises a forward analog voice channel and the receiving step receives the handoff message as part of a mobile station control message.

17. The method of claim 10 wherein the forward communication channel comprises a forward digital traffic channel and the receiving step receives the handoff message as part of a normal handoff message.

18. The method of claim 10 wherein the forward communication channel comprises a forward digital traffic channel and the receiving step receives the handoff message as part of a dedicated digital traffic channel handoff message.

* * * * *